United States Patent
Furuse et al.

(10) Patent No.: US 9,882,242 B2
(45) Date of Patent: Jan. 30, 2018

(54) ANGLE DETECTING DEVICE, MOTOR DRIVE CONTROLLING DEVICE, MOTOR DEVICE AND METHOD OF CONTROLLING AN ANGLE DETECTING DEVICE

(71) Applicants: Katsuhisa Furuse, Hyogo (JP); Tomohiko Kamatani, Osaka (JP)

(72) Inventors: Katsuhisa Furuse, Hyogo (JP); Tomohiko Kamatani, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/120,811

(22) PCT Filed: Jan. 21, 2015

(86) PCT No.: PCT/JP2015/052247
§ 371 (c)(1),
(2) Date: Aug. 23, 2016

(87) PCT Pub. No.: WO2015/133203
PCT Pub. Date: Sep. 11, 2015

(65) Prior Publication Data
US 2016/0365815 A1    Dec. 15, 2016

(30) Foreign Application Priority Data

Mar. 6, 2014   (JP) ................................ 2014-044228

(51) Int. Cl.
*H02P 21/06*    (2016.01)
*H01M 10/0565*    (2010.01)
(Continued)

(52) U.S. Cl.
CPC .......... *H01M 10/0565* (2013.01); *G01B 7/30* (2013.01); *G01D 5/24485* (2013.01); *H01B 1/06* (2013.01);
(Continued)

(58) Field of Classification Search
CPC ........................................................ H02P 21/06
(Continued)

(56) References Cited

U.S. PATENT DOCUMENTS 5,796,231 A    8/1998 Kyodo
5,969,489 A    10/1999 Itou et al.
(Continued)

FOREIGN PATENT DOCUMENTS

EP    0748039 A2    12/1996
JP    H10-052082    2/1998
(Continued)

OTHER PUBLICATIONS

International Search Report dated Apr. 28, 2015 in PCT/JP2015/052247 filed on Jan. 21, 2015.
(Continued)

*Primary Examiner* — David S Luo
(74) *Attorney, Agent, or Firm* — Cooper & Dunham LLP

(57) ABSTRACT

An angle detecting device, generating phase information for indicating phases corresponding to rotational positions of a rotor of a motor, comprises an intersection detecting unit, configured to detect timing at which paired sensor signals intersect with each other, and to detect points of intersection; an intersection level detecting unit configured to detect intersection levels that are amplitude levels of the sensor signals, based on the timing at which the respective pairs of the sensor signals intersect with each other; an intersection level adjusting unit configured to adjust the detected intersection levels of the sensor signals to a certain amplitude level, and to output a successively selected one of the adjusted sensor signals as an intersection level adjustment signal; and a phase information detecting unit configured to generate detection results indicative of whether the intersection level adjustment signal is greater than respective (Continued)

threshold levels corresponding to the phases, thereby generating the phase information responsive to the detection results.

9 Claims, 8 Drawing Sheets

(51) Int. Cl.
| | |
|---|---|
| H01B 1/06 | (2006.01) |
| H01B 1/08 | (2006.01) |
| H01B 1/10 | (2006.01) |
| H01M 10/052 | (2010.01) |
| G01B 7/30 | (2006.01) |
| G01D 5/244 | (2006.01) |
| H02P 6/182 | (2016.01) |
| H01M 10/0525 | (2010.01) |
| H02P 6/16 | (2016.01) |

(52) U.S. Cl.
CPC ............... *H01B 1/08* (2013.01); *H01B 1/10* (2013.01); *H01M 10/052* (2013.01); *H01M 10/0525* (2013.01); *H02P 6/182* (2013.01); *H02P 21/06* (2013.01); *H01M 2300/0082* (2013.01); *H02P 6/16* (2013.01); *Y02T 10/7011* (2013.01)

(58) Field of Classification Search
USPC .................................................. 318/459, 445
See application file for complete search history.

(56) References Cited

U.S. PATENT DOCUMENTS

| | | | |
|---|---|---|---|
| 8,193,743 B2 * | 6/2012 | Yamada | H02M 7/53875 318/162 |
| 8,860,346 B2 | 10/2014 | Shimizu et al. | |
| 8,866,421 B2 | 10/2014 | Kamatani et al. | |
| 8,872,453 B2 | 10/2014 | Kamatani et al. | |
| 2013/0050306 A1 | 2/2013 | Sohara | |
| 2013/0106326 A1 | 5/2013 | Kamatani et al. | |
| 2013/0106327 A1 | 5/2013 | Kamatani et al. | |

FOREIGN PATENT DOCUMENTS

| | | |
|---|---|---|
| JP | 2005-073438 | 3/2005 |
| JP | 2013-066374 | 4/2013 |
| JP | 2013-099022 | 5/2013 |
| JP | 2013-099023 | 5/2013 |

OTHER PUBLICATIONS

European search report dated Feb. 15, 2017 in corresponding European Patent Application No. 15758435.0.

* cited by examiner

| ELECTRIC ANGLE (°) | AMPLITUDE RATE |
|---|---|
| 60 | 0.866 |
| 54 | 0.809 |
| 48 | 0.743 |
| 42 | 0.669 |
| 36 | 0.588 |
| 30 | 0.500 |
| 24 | 0.407 |
| 18 | 0.309 |
| 12 | 0.208 |
| 6 | 0.105 |

ANGLE DETECTING DEVICE, MOTOR DRIVE CONTROLLING DEVICE, MOTOR DEVICE AND METHOD OF CONTROLLING AN ANGLE DETECTING DEVICE

TECHNICAL FIELD

The disclosures herein relate to an angle detecting device, a motor drive controlling device and a motor device configured to detect phases of a rotor of a motor.

BACKGROUND ART

A rotation angle of a rotor needs to be detected in order to control a rotational position of a motor. A rotation angle of the rotor of the motor can be generally detected by connecting a rotary encoder with a rotation axis of the rotor of the motor. In this case, the rotary encoder outputs a two phase pulse signal, varying according to a rotation angle of the rotor of the motor, and having ¼ cycle phase difference. A relative rotation angle can be detected based on edge detection and two phase High/Low status of an output signal of the rotary encoder.

An optical encoder, as an above mentioned rotary encoder, is composed of a disk, on which slits are formed at equal intervals in its outer peripheral part, and two photo interrupters disposed at ¼ intervals of a slit pitch of the disk. Then, the two phase pulse signal can be obtained by performing binarization of an output signal of the two photo interrupters.

Also, in a motor drive controlling device, described in Japanese laid open Patent Publication No. 2013-99023, a method for detecting and outputting a phase information signal, by using a plurality of sensor signals having signal levels corresponding to rotational positions of a rotor of a motor, is disclosed. That is, the sensor signals or corresponding signals U1, V1, and W1 are divided into a plurality of phase sections, compared with threshold levels corresponding to the phases, and it is detected that a signal level has reached the threshold to output a phase information signal Phsyn, indicating the detected phase.

RELATED ART DOCUMENT

Patent Document

[Patent Document 1]: Japanese Laid-open Patent Publication No. 2013-99023

DISCLOSURE OF THE INVENTION

Problems to be Solved by the Invention

However, in the motor drive controlling device described above, signals from a plurality of sensors have variance of amplitude level. Also, in a manufacturing process, errors in mounting the sensors can be made to cause phase errors of the signals from the sensors. Therefore, amplitude levels (intersection levels) are varied according to phase sections into which the signals are divided, even if the amplitude level has been adjusted. Thus, errors may be made in detecting phase, and phase detection does not work if the errors become larger.

An object of this disclosure of the present technology is to provide an angle detecting device capable of rotational position detection of a rotor of a motor with higher precision.

Means for Solving the Problems

According to an embodiment of the present invention, an angle detecting device is provided.

The angle detecting device, generating phase information for indicating phases corresponding to rotational positions of a rotor of a motor having plural phases of coils based on a plurality of sensor signals, each of which has a signal level indicative of a rotational position of the rotor of the motor, to detect the rotational positions of the rotor of the motor, comprises an intersection detecting unit, receiving the sensor signals, configured to detect timing at which each pair of the sensor signals intersect with each other, and to detect points of intersection between the sensor signals; an intersection level detecting unit configured to detect intersection levels that are amplitude levels of the sensor signals at the points of intersection, based on the timing at which the sensor signals are paired and intersect with each other; an intersection level adjusting unit configured to adjust the detected intersection levels of the sensor signals to a certain amplitude level, to output a successively selected one of the adjusted sensor signals as an intersection level adjustment signal; and a phase information detecting unit configured to generate detection results indicative of whether the intersection level adjustment signal is greater than respective threshold levels corresponding to the phases, thereby generating the phase information responsive to the detection results, wherein a plurality of the threshold levels are set in every phase section, which is a period between a phase where intersection level adjustment signal becomes the certain amplitude level and a phase where intersection level adjustment signal becomes the reference level.

Effects of the Present Invention

According to the disclosed angle detecting device, phase information indicating a rotational position of the rotor can be detected with high precision since intersection levels of sensor signals or sensor processing signals which correspond to the sensor signals are adjusted to a certain amplitude level.

MODE FOR CARRYING OUT THE INVENTION

Figure 1:
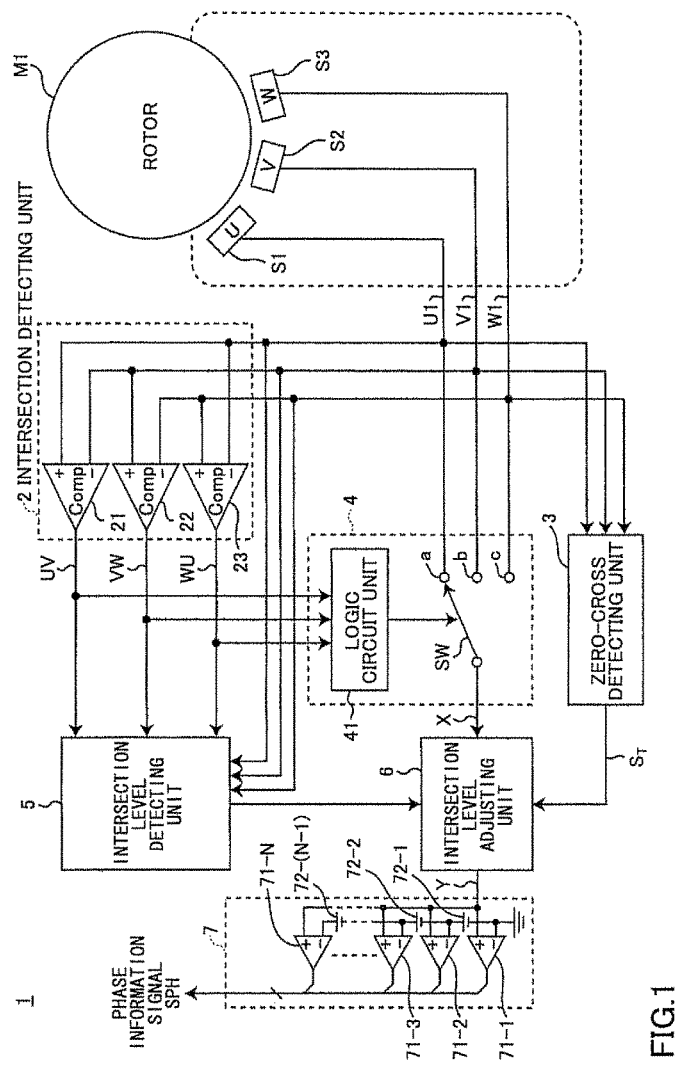
FIG. 1 is a block diagram for illustrating a configuration of an angle detecting device of the first embodiment.

Herein below, embodiments of present technology will be described, with reference to accompanying drawings. Additionally, an identical reference numeral will be applied to an identical element.

First Embodiment

FIG. 1 is a block diagram for illustrating a configuration of an angle detecting device of the first embodiment. In FIG. 1, angle detecting device 1 is configured to include magnetic sensors (herein after referred as sensors) S1-S3 (U phase, V phase and W phase), which are disposed around a rotor of a motor M1 having coils of plural phases, for detecting a rotation angle of the rotor. Also, the angle detecting device 1 outputs phase information of the motor M1 detected based on the sensor signals U1, V1 and W1 from the sensors S1-S3. Further, the angle detecting device 1 is configured to include an intersection detecting unit 2 for detecting a point of intersection of each pair of the sensor signals U1, V1 and W1, a zero-cross detecting unit 3, a signal selecting unit 4, an intersection level detecting unit 5, an intersection level adjusting unit 6, and a phase detecting unit 7. The intersection detecting unit 2 is configured to include a comparator 21 that detects timing at which the sensor signal U1 intersects with the sensor signal V1, and a comparator 22 that detects timing at which the sensor signal V1 intersects with the sensor signal W1. Also, the intersection detecting unit 2 is configured to include a comparator 23 that detects timing at which the sensor signal W1 intersects with the sensor signal U1. Additionally, a motor drive controlling device that has the angle detecting device 1 controls rotor driving in the motor M1 based on rotational position information from the angle detecting device 1. The motor drive controlling device includes the angle detecting device 1.

The signal selecting unit 4 is configured to include a logic circuit unit 41 and a switch SW. The phase detecting unit 7 is configured to include a plurality (N−1) of voltage sources 72-1-72-(N−1) and a plurality (N) of phase detectors 71-1-71-N. The angle detecting device 1 generates a phase information signal SPH indicating phases, which correspond to rotational positions of the rotor of the motor M1, based on the plurality of sensor signals having a plurality of signal levels corresponding to the rotational position of the rotor of the motor M1 to detect the rotational position of the rotor of the motor M1. Also, the intersection detecting unit 2, receiving the sensor signals U1, V1 and W1 as sensor processing signals, detects timing at which sensor processing signals intersect with each other to detect a point of intersection where the sensor processing signals intersect with each other.

In FIG. 1, the sensor signals U1, V1 and W1 output from the respective sensors S1, S2 and S3 are continuously-varying signals that correspond to magnetic flux density variation of the rotor of the motor M1 having the coils. The sensors S1, S2 and S3 use Hall elements and the sensor signals U1, V1 and W1 are generated by the Hall elements. The sensor signals U1, V1 and W1 have a waveform of a sine wave or one similar to a sine wave. Also, the sensor signals U1, V1 and W1 are respectively disposed at intervals of an electric angle 120°.

The comparator 21 generates an intersection detection signal UV having High-level or Low-level by comparing an amplitude level of the sensor signal U1 with an amplitude level of the sensor signal V1 and outputting the intersection detection signal UV to the intersection level detecting unit 5 and a logic circuit unit 41. That is, in a case where an amplitude level of the sensor signal U1 is equal to or higher than the amplitude level of the sensor signal V1, a High-level intersection detection signal UV is output, while in a case where an amplitude level of the sensor signal U1 is lower than an amplitude level of the sensor signal V1, a Low-level intersection detection signal UV is output.

The comparator 22 generates an intersection detection signal VW having High-level or Low-level by comparing an amplitude level of the sensor signal V1 with an amplitude level of the sensor signal W1 and outputting the intersection detection signal VW to the intersection level detecting unit 5 and the logic circuit unit 41. That is, in a case where an amplitude level of the sensor signal V1 is equal to or higher than the amplitude level of the sensor signal W1, a High-level intersection detection signal VW is output, while in a case where an amplitude level of the sensor signal V1 is lower than an amplitude level of the sensor signal W1, a Low-level intersection detection signal VW is output.

The comparator 23 generates intersection detection signal WU having High-level or Low-level by comparing an amplitude level of the sensor signal W1 with an amplitude level of the sensor signal U1 and outputting the intersection detection signal WU to the intersection level detecting unit 5 and the logic circuit unit 41. That is, in a case where an amplitude level of the sensor signal W1 is equal to or higher than the amplitude level of the sensor signal U1, a High-level intersection detection signal WU is output, while in a case where an amplitude level of the sensor signal W1 is lower than an amplitude level of the sensor signal U1, a Low-level intersection detection signal WU is output.

The zero-cross detecting unit 3 detects zero-crossing points, at which each amplitude level of the sensor signals U1, V1 and W1 passes a reference level, based on the sensor signals U1, and W1 from sensors S1, S2 and S3, and generates a zero-cross toggle signal $S_T$. Then, zero-cross detecting unit 3 outputs the zero-cross toggle signal $S_T$ to the intersection level adjusting unit 6. That is, the zero-cross detecting unit 3 detects timing at which each of the sensor signals U1, V1 and W1 passes the reference level. Here, the reference level means the amplitude level 0.

The logic circuit unit 41 controls the switch SW, based on an amplitude level variation of the intersection detection signals UV, VW and WU, to select a sensor signal to have the amplitude level thereof adjusted. The logic circuit unit 41 selects the sensor signal U1 as a selection signal X when it is detected that W1<U1<V1 or W1>U1>V1 from the amplitude level variation of the intersection detection signals UV, VW and WU. And, the logic circuit unit 41 selects the sensor signal W1 as a selection signal X when it is detected that V1<W1<U1 or V1>W1>U1. Further, the logic circuit unit 41 selects the sensor signal V1 as a selection signal X when it is detected that U1<V1<W1 or U1>V1>W1. That is, the logic circuit unit 41 switches the switch SW to a switch contact "a" so as to select the sensor signal U1, during a period from timing at which the intersection detection signal UV varies from Low-level to High-level to timing at which the intersection detection signal WU varies from High-level to Low-level. Also, the logic circuit unit 41 switches the switch SW to a switch contact "b" so as to select the sensor signal V1, during a period from timing at which the intersection detection signal VW varies from Low-level to High-level to timing at which the intersection detection signal UV varies from High-level to Low-level.

Further, the logic circuit unit 41 switches the switch SW to a switch contact "c" so as to select the sensor signal W1, during a period from timing at which the intersection detection signal WU varies from High-level to Low-level to timing at which the intersection detection signal VW varies from Low-level to High-level.

The intersection level detecting unit 5 respectively detects amplitude levels at points of intersection where the sensor signal U1 and the sensor signal V1 intersect with each other, at timing when the intersection detection signal UV varies from Low-level to High-level and at timing when the intersection detection signal UV varies from High-level to Low-level. Then, the intersection level detecting unit 5 outputs values of the amplitude levels to the intersection level adjusting unit 6. Also, the intersection level detecting unit 5 respectively detects amplitude levels at points of intersection where the sensor signal V1 and the sensor signal W1 intersect with each other, at timing when the intersection detection signal VW varies from Low-level to High-level and at timing when the intersection detection signal VW varies from High-level to Low-level. Then, the intersection level detecting unit 5 outputs values of the amplitude levels to the intersection level adjusting unit 6. Further, the intersection level detecting unit 5 respectively detects amplitude levels at points of intersection where the sensor signal W1 and sensor signal U1 intersect with each other, at timing when the intersection detection signal WU varies from Low-level to High-level and at timing when the intersection detection signal WU varies from High-level to Low-level. Then, the intersection level detecting unit 5 outputs values of the amplitude levels to the intersection level adjusting unit 6. That is, the intersection level detecting unit 5 detects amplitude levels at points of intersection of each pair of the sensor signals U1, V1 and W1 based on the intersection detection signals UV, VW and WU from the intersection detecting unit 2, and outputs values of the amplitude levels to the intersection level adjusting unit 6.

The intersection level adjusting unit 6 adjusts selection signal X selected by the signal selecting unit 4, based on the zero-cross toggle signal $S_T$ and amplitude levels at points of intersection of each pair of the sensor signals U1, V1 and W1, so that the amplitude levels of the points of intersection become a certain amplitude level with respect to the zero-crossing point as a reference level. Then, the intersection level adjusting unit 6 outputs the adjusted signal, as an intersection level adjustment signal Y, to the phase detecting unit 7. Here, the intersection level adjusting unit 6 adjusts the selection signal X to generate the intersection level adjustment signal Y setting the zero-crossing point, where the sensor signals U1, V1 and W1 pass the reference level, as the reference level.

The phase detecting unit 7 outputs a certain rotation angle of the motor M1 as the phase information signal SPH by comparing the intersection level adjustment signal Y with a plurality of threshold levels which are generated by a plurality (N−1) of voltage sources 72-1-72-(N−1) and are different each other by a certain voltage difference. That is, the phase detecting unit 7 creates the phase information signal SPH, indicating rotation angle of the motor M1, when an amplitude level of the intersection level adjustment signal Y passes a certain threshold level.

In the following, an operation of the angle detecting device 1 of the first embodiment, configured as described above, will be described.

Figure 2:
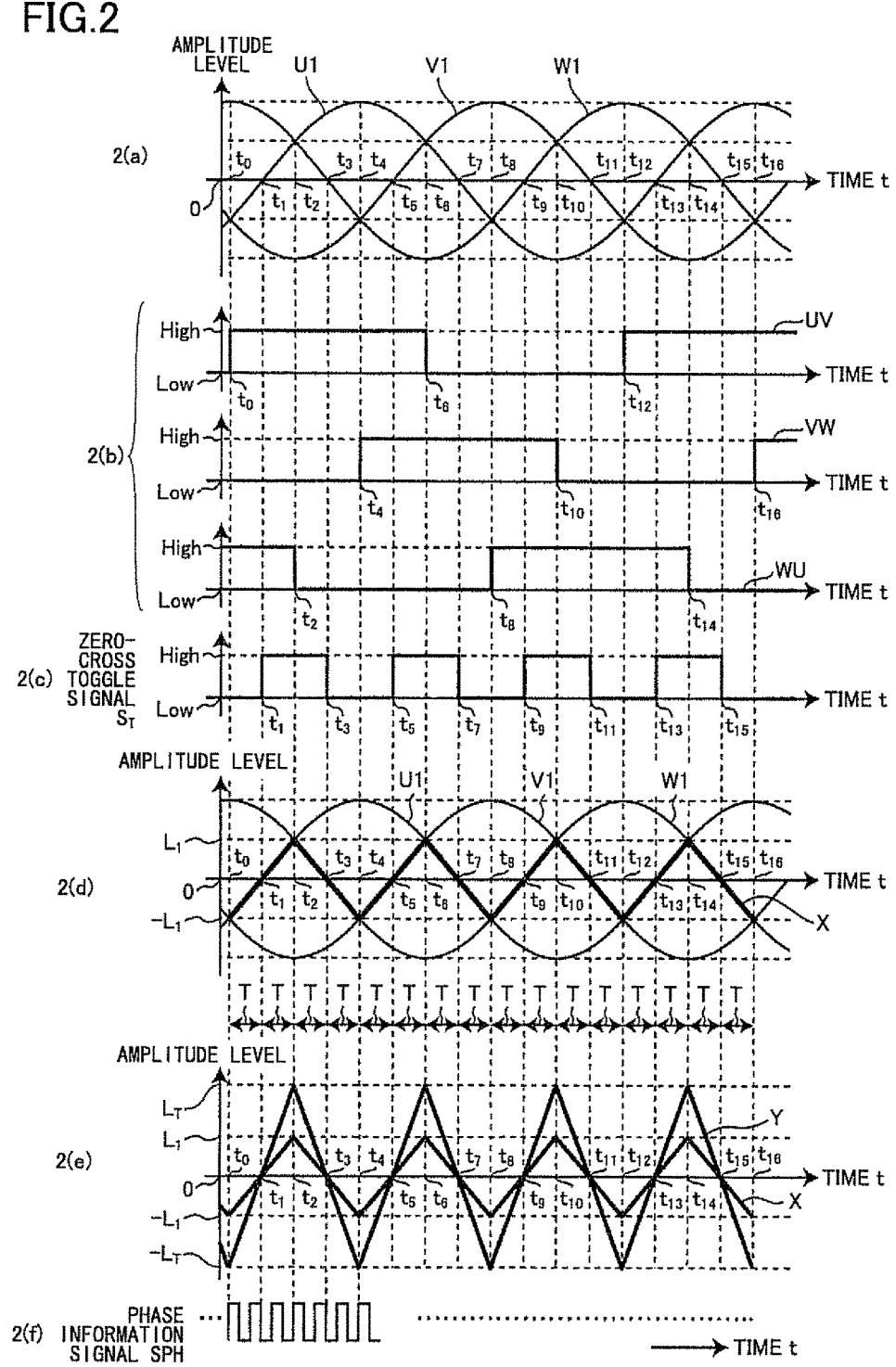
FIG. 2 is a timing diagram for illustrating an operation of the angle detecting device of the first embodiment.

FIG. 2 is a timing diagram for illustrating an operation of the angle detecting device 1 of the first embodiment. Waveforms 2(a) illustrates variances of amplitude levels of the sensor signals U1, V1 and W1, which are generated by the sensors S1, S2 and S3 of the angle detecting device 1 shown in FIG. 1, with respect to time t. In the waveforms 2(a), time base waveforms of the sensor signals U1, V1 and W1 from the sensors S1, S2 and S3, which are respectively disposed at intervals of an electric angle 120°, are sine wave signals.

Waveforms 2(b) in FIG. 2 illustrates signal level variances of the intersection detection signals UV, VW and WU generated by the intersection detecting unit 2 shown in FIG. 1, using an elapsed time base in common with that of waveforms 2(a). In waveforms 2(b), the intersection detection signal UV, which shows timing at which the sensor signal U1 and the sensor signal V1 intersect with each other, becomes High-level at timing $t_0$, and becomes Low-level at timing $t_6$, while the sensor signal U1 and the sensor signal V1 intersect with each other at both of the timings. Also, the intersection detection signal VW, which shows timing at which the sensor signal V1 and the sensor signal W1 intersect with each other, becomes High-level at timing $t_4$, and becomes Low-level at timing $t_{10}$, while the sensor signal V1 and the sensor signal W1 intersect with each other at both of the timings. Further, the intersection detection signal WU, which shows timing at which the sensor signal W1 and the sensor signal U1 intersect with each other, becomes High-level at timing $t_8$, and becomes Low-level at timing $t_{14}$, while the sensor signal W1 and the sensor signal U1 intersect with each other at both of the timings. Additionally, the waveforms of the intersection detection signals UV, VW and WU are periodically repeated.

Waveform 2(c) in FIG. 2 illustrates signal level variance of the zero-cross toggle signal $S_T$ generated by the zero-cross detecting unit 3 shown in FIG. 1, using an elapsed time base in common with that of waveforms 2(a). In waveform 2(c), timings at which amplitude levels of sine waves of the sensor signals U1, V1, and W1, shown in waveforms 2(a), become the reference level is shown. Here, the zero-cross toggle signal $S_T$ becomes High-level at timing $t_1$ when the sensor signal U1 passes the reference level, and becomes Low-level at timing $t_3$ when the sensor signal W1 passes the reference level. Further, the zero-cross toggle signal $S_T$ becomes High-level at timing $t_5$ when the sensor signal V1 passes the reference level, and becomes Low-level at timing $t_7$ when the sensor signal U1 passes the reference level. Hereinafter similarly, the zero-cross toggle signal $S_T$ varies repeatedly.

Waveforms 2(d) in FIG. 2 illustrates amplitude level variance of the selection signal X selected by the signal selecting unit 4 shown in FIG. 1, using an elapsed time base in common with that of waveforms 2(a). In waveforms 2(d), a waveform of the selection signal X selected by the signal selecting unit 4 is shown in bold. That is, in a period from timing $t_0$ to timing $t_2$, the sensor signal U1 is selected; in a period from timing $t_2$ to timing $t_4$, the sensor signal W1 is selected; and in a period from timing $t_4$ to timing $t_0$, the sensor signal V1 is selected. Further, in a period from timing $t_6$ to timing $t_8$, the sensor signal U1 is selected; in a period from timing $t_8$ to timing $t_{10}$, the sensor signal W1 is selected; and in a period from timing $t_{10}$ to timing $t_{12}$, the sensor signal V1 is selected. Here, at timing $t_2$, timing $t_6$, timing $t_{10}$ and timing $t_{14}$, the selection signal X has an amplitude level $L_1$, and at timing $t_0$, timing $t_4$, timing $t_8$, timing $t_{12}$ and timing $t_{16}$, the selection signal X has an amplitude level $-L_1$.

Waveforms 2(e) in FIG. 2 illustrates amplitude level variance of the intersection level adjustment signal Y adjusted by the intersection level adjusting unit 6 shown in FIG. 1, using an elapsed time base in common with that of waveforms 2(a). In waveforms 2(e), the intersection level adjustment signal Y, in which amplitude level $L_1$ and $-L_1$ at waveform peaks of the selection signal X are adjusted to become amplitude level $L_T$ and $-L_T$, is shown. That is, zero-crossing points at timing $t_1$, timing $t_3$, timing $t_5$ and timing $t_7$ are set as reference levels, and intersection levels $L_1$ and $-L_1$ are adjusted to a certain amplitude levels of $L_T$ and $-L_T$.

Waveform 2(f) in FIG. 2 illustrates the phase information signal SPH generated by phase detecting unit 7 shown in FIG. 1, using an elapsed time base in common with that of waveforms 2(a). In waveform 2(f) in a period between the reference level and the amplitude level $L_T$ and a period between the reference level and amplitude level $-L_T$ are shown as a phase section T corresponding to a range of electric angle 60°. In the phase section T, a plurality of the threshold levels, which correspond to rotational positions of the rotor of the motor M1, are set.

Figures 3, 4:
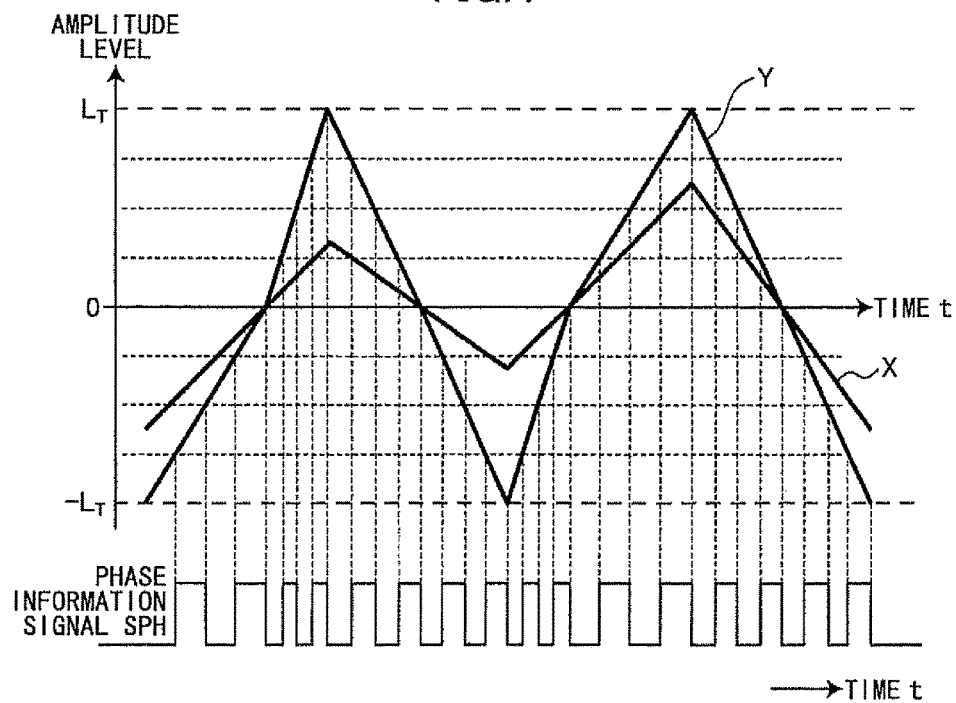
FIG. 3 is a table showing a relation between an electric angle and amplitude rate of the intersection adjustment signal Y which is adjusted by the intersection adjusting unit shown in FIG. 1.
FIG. 4 is a time base waveform diagram showing variance of amplitude level of the intersection adjustment signal Y with respect to time t, which is adjusted by the intersection level adjusting unit 6 shown in FIG. 1, in a case where attachment errors of sensors S1, S2 and S3 of the angle detecting device 1 of FIG. 1 have been made.

FIG. 3 is a table showing a relation between an electric angle and amplitude rate in the intersection adjustment signal Y which is adjusted by the intersection adjusting unit 6 shown in FIG. 1. Here, the amplitude rate means a rate of amplitude level at an arbitrary electric angle with respect to a largest amplitude level in an identical sine wave.

In the present embodiment, in the phase section T which corresponds to a range of electric angle 60°, phase information signals SPH are output ten times. In this case, the rate of amplitude level $L_T$ and $-L_T$ correspond to an amplitude rate 0.866 at electric angle 60°, and a plurality of threshold levels are set for the amplitude rates of the electric angles. That is, in the phase section T that is a period between the reference level and the amplitude level $L_T$, and a period between the reference level and the amplitude level $-L_T$, ten threshold levels are set, while phase information signals SPH are generated and output at timing when the intersection level adjustment signal Y passes the threshold levels.

As shown in waveforms 2(e), in a case where the signals U1, V1 and W1 from the sensors S1, S2 and S3 are identically disposed at intervals of an electric angle 120°, setting the phase section T as a period between the reference level and the amplitude level $L_T$, and a period between the reference level and the amplitude level $-L_T$, the widths of phase sections T are equal. Therefore, the phase information signal SPH has a pulse width equally dividing the phase section T. However, in an actual use, phase information signals do not have equal pulse widths due to attachment errors of the sensors S1, S2 and S3. In the following, this will be described.

FIG. 4 is a time-based waveform diagram showing variance of amplitude level of the intersection adjustment signal Y with respect to time t, which is adjusted by the intersection level adjusting unit 6 shown in FIG. 1, in a case where attachment errors of the sensors S1, S2 and S3 of the angle detecting device 1 of FIG. 1 have been made. In FIG. 4, variance of amplitude level of the intersection level adjustment signal Y, in a case where attachment errors of sensors S1, S2 and S3 have been made, is shown.

In FIG. 4, amplitude levels at the points of intersection of the pairs of the sensor signals U1, V1 and W1 (peaks of selection signal X) are different from each other, so that intervals of the zero-cross toggle signal $S_T$ become unequal. Therefore, errors in the phase information signal SPH are made, and the errors may become larger than the attachment errors of the sensors S1, S2 and S3. In this case, the difference of the amplitude levels at peaks of the selection signal X makes it difficult to detect the timing at which the signal passes each of the thresholds. Here, by adjusting each of the peak levels of the selection signal X to be an amplitude level $L_T$ or an amplitude level $-L_T$, a more precise phase information signal can be obtained.

The angle detecting device 1 of the above described embodiment can reduce errors in the phase information signal SPH, by adjusting amplitude levels at points where the pairs of the sensor signals U1, V1 and W1 intersect with each other to a certain amplitude level. Therefore, a more precise phase information signal can be generated and the rotational position information of the motor M1 can be detected with higher precision.

Second Embodiment

The angle detecting device 1 of the first embodiment detects rotational position information of the motor M1, using sine wave signals generated by the sensors S1, S2 and S3 as the sensor processing signals. Meanwhile, the present embodiment is characterized by using signals, which are obtained by performing full-wave rectification on sine wave signals generated by the sensors S1, S2 and S3, in order to detect rotational position information of the motor M1. Therefore, in the present embodiment, a circuit scale can be further reduced compared with the case of the first embodiment.

Figure 5:
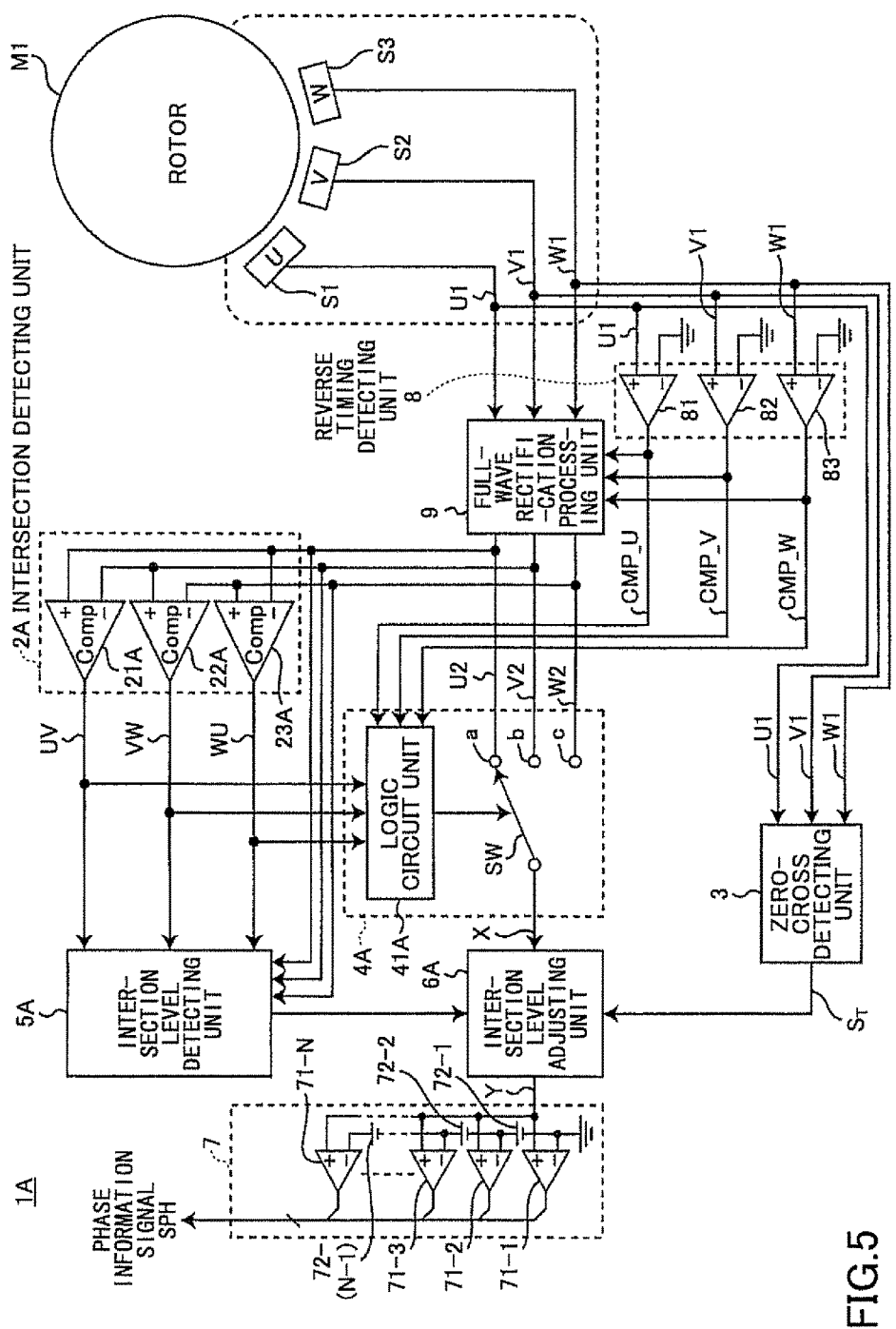
FIG. 5 is a block diagram showing a configuration of an angle detecting device of the second embodiment.

FIG. 5 is a block diagram showing a configuration of an angle detecting device 1A of the second embodiment. The angle detecting device 1A shown in FIG. 5 includes, compared with the angle detecting device 1 shown in FIG. 1, an intersection detecting unit 2A instead of the intersection detecting unit 2, a signal selecting unit 4A instead of the signal detecting unit 4, and an intersection level detecting unit 5A instead of the intersection detecting unit 5. Also, the angle detecting device 1A shown in FIG. 5, compared with the angle detecting device 1 shown in FIG. 1, is characterized by including an intersection level adjusting unit 6A instead of the intersection level adjusting unit 6, and further including a reverse timing detecting unit 8 and a full-wave rectification processing unit 9. The signal selecting unit 4A, compared with the signal selecting unit 4, is characterized by including a logic circuit unit 41A instead of the logic circuit unit 41.

In FIG. 5, the intersection detecting unit 2A is configured to include a comparator 21A for detecting timing at which a sensor signal U2 intersects with a sensor signal V2, and a comparator 22A for detecting timing at which the sensor signal V2 intersects with a sensor signal W2. Further, the intersection detecting unit 2A is configured to include a comparator 23A for detecting timing at which the sensor signal W2 intersects with the sensor signal U2.

The reverse timing detecting unit 8 is configured to include a comparator 81 for detecting timing at which a sensor signal U1 is inverted, a comparator 82 for detecting timing at which a sensor signal V1 is inverted, and a comparator 83 for detecting timing at which a sensor signal W1 is inverted. Here, the reverse timing detecting unit 8 is configured to include comparators 81, 82 and 83 whose threshold levels are set to 0 V. Further, intersection detecting unit 2A has full-wave rectified signals input, which are output from the full-wave rectification processing unit 9, as respective sensor processing signals, and detects timing at which the paired sensor processing signals intersect with each other to detect points of intersection of the sensor processing signals.

In FIG. 5, the comparator 81 generates a reverse timing signal CMP_U having High-level or Low-level by comparing an amplitude level of the sensor signal U1 with a reference level. Then, the comparator 81 outputs the reverse timing signal CMP_U to the full-wave rectification processing unit 9 and the logic circuit unit 41A. That is, a High-level reverse timing signal CMP_U is output in a case where an amplitude level of the sensor signal U1 is equal to or more than the reference level, while a Low-level reverse timing signal CMP_U is output in a case where an amplitude level of the sensor signal U1 is lower than the reference level. Here, a waveform of the sensor signal U1 is inverted with the reference level as the center when the reverse timing signal CMP_U is Low-level.

The comparator 82 generates a reverse timing signal CMP_V having High-level or Low-level by comparing an amplitude level of the sensor signal V1 with a reference level. Then, the comparator 82 outputs the reverse timing signal CMP_V to the full-wave rectification processing unit 9 and the logic circuit unit 41A. That is, a High-level reverse timing signal CMP_V is output in a case where an amplitude level of the sensor signal V1 is equal to or more than the reference level, while a Low-level reverse timing signal CMP_V is output in a case where an amplitude level of the sensor signal V1 is lower than the reference level. Here, a waveform of the sensor signal V1 is inverted with the reference level as the center when the reverse timing signal CMP_V is Low-level.

The comparator 83 generates a reverse timing signal CMP_W having High-level or Low-level by comparing an amplitude level of the sensor signal W1 with a reference level. Then, the comparator 83 outputs the reverse timing signal CMP_W to the full-wave rectification processing unit 9 and the logic circuit unit 41A. That is, a High-level reverse timing signal CMP_W is output in a case where an amplitude level of the sensor signal W1 is equal to or more than the reference level, while a Low-level reverse timing signal CMP_W is output in a case where an amplitude level of the sensor signal W1 is lower than the reference level. Here, a waveform of the sensor signal W1 is inverted with the reference level as the center when the reverse timing signal CMP_W is Low-level.

The full-wave rectification processing unit 9 generates the sensor signal U2 based on the reverse timing signals CMP_U, CMP_V and CMP_W from the reverse timing detecting unit 8. Then, the full-wave rectification processing unit 9 outputs the sensor signal U2, as the sensor processing signal, to the intersection level detecting unit 5A, the intersection detecting unit 2A and the signal selecting unit 4A. Here, the full-wave rectification processing unit 9 inverts the sensor signals U1, V1 and W1 with the reference level at the center to generate inverted sensor signals IU1, IV1 and IW1 when the reverse timing signals CMP_U, CMP_V and CMP_W are Low-level. Then, the full-wave rectification processing unit 9 respectively outputs the inverted sensor signals IU1, IV1 and IW1 as sensor signals U2, V2 and W2. And the full-wave rectification processing unit 9 respectively outputs the sensor signals U1, V1 and W1 when the reverse timing signals CMP_U, CMP_V and CMP_W are High-level.

The comparator 21A generates an intersection detection signal UV having High-level or Low-level by comparing an amplitude level of the sensor signal U2 with an amplitude level of the sensor signal V2. Then, the comparator 21A outputs the intersection detection signal UV to the intersection level detecting unit 5A and the logic circuit unit 41A. That is, in a case where an amplitude level of the sensor signal U2 is equal to or higher than the amplitude level of the sensor signal V2, a High-level intersection detection signal UV is output, while in a case where an amplitude level of the sensor signal U2 is lower than an amplitude level of the sensor signal V2, a Low-level intersection detection signal UV is output.

The comparator 22A generates an intersection detection signal VW having High-level or Low-level by comparing an amplitude level of the sensor signal V2 with an amplitude level of the sensor signal W2. Then, the comparator 22A outputs the intersection detection signal VW to the intersection level detecting unit 5A and the logic circuit unit 41A. That is, in a case where an amplitude level of the sensor signal V2 is equal to or higher than an amplitude level of the sensor signal W2, a High-level intersection detection signal VW is output, while in a case where an amplitude level of the sensor signal V2 is lower than an amplitude level of the sensor signal W2, a Low-level intersection detection signal VW is output.

The comparator 23A generates an intersection detection signal WU having High-level or Low-level by comparing an amplitude level of the sensor signal W2 with an amplitude level of the sensor signal U2. Then, the comparator 23A outputs the intersection detection signal WU to the intersection level detecting unit 5A and the logic circuit unit 41A. That is, in a case where an amplitude level of the sensor signal W2 is equal to or higher than the amplitude level of the sensor signal U2, a High-level intersection detection signal WU is output, while in a case where an amplitude level of the sensor signal W2 is lower than an amplitude level of the sensor signal U2, a Low-level intersection detection signal WU is output.

The intersection level detecting unit 5A detects amplitude levels at points of intersection where the sensor signal U2 and the sensor signal V2 intersect with each other, at timing when the intersection detection signal UV varies from Low-level to High-level or at timing when the intersection detection signal UV varies from High-level to Low-level. Then, the intersection level detecting unit 5A outputs the values of the amplitude levels to the intersection level adjusting unit 6A. Also, the intersection level detecting unit 5A detects amplitude levels at points of intersection where the sensor signal V2 and the sensor signal W2 intersect with each other, at timing when the intersection detection signal VW varies from Low-level to High-level or at timing when the intersection detection signal VW varies from High-level to Low-level. Then, the intersection level detecting unit 5A outputs the values of the amplitude levels to the intersection level adjusting unit 6A. Further, the intersection level detecting unit 5A detects amplitude levels at points of intersection where the sensor signal W2 and the sensor signal U2 intersect with each other, at timing when the intersection detection signal WU varies from Low-level to High-level and at timing when the intersection detection signal WU varies from High-level to Low-level. Then, the intersection level detecting unit 5A outputs the values of the amplitude levels to the intersection level adjusting unit 6A. That is, the intersection level detecting unit 5A respectively detects amplitude levels at points of intersection of each pair of the sensor signals U2, V2 and W2 based on the intersection detection signals UV, VW and WU from the intersection detecting unit 2A, and outputs the detected values of the amplitude levels to the intersection level adjusting unit 6.

The logic circuit unit 41A controls the switch SW, based on amplitude level variation of the intersection detection signals UV, VW and WU, to select a sensor signal to adjusted its amplitude level. Here, the logic circuit unit 41A selects the sensor signals U2, V2 and W2, based on the intersection detection signals UV, VW and WU and the reverse timing signals CMP_U, CMP_V and CMP_W. The logic circuit unit 41A selects the sensor signal U2 as the selection signal X in a case where the intersection detection signal WU is High-level and the reverse timing signal CMP_U is Low-level, or in a case where the intersection detection signal UV is Low-level and the reverse timing signal CMP_V is Low-level. Also, the logic circuit unit 41A selects the sensor signal V2 as the selection signal X in a case where the intersection detection signal VW is Low-level and the reverse timing signal CMP_W is Low-level, or in a case where the intersection detection signal UV is High-level and the reverse timing signal CMP_W is Low-level. Further, the logic circuit unit 41A selects the sensor signal W2 as the selection signal X in a case where the intersection detection signal VW is High-level and the reverse timing signal CMP_U is Low-level, or in a case where the intersection detection signal WU is Low-level and the reverse timing signal CMP_U is Low-level. That is, the logic circuit unit 41A switches a switch SW to a switch contact "a" so as to select the sensor signal U2, during a period from timing at which the intersection detection signal UV varies from Low-level to High-level to timing at which the intersection detection signal WU varies from High-level to Low-level. Also, the logic circuit unit 41A switches the switch SW to a switch contact "b" so as to select the sensor signal V2, during a period from timing at which the intersection detection signal VW varies from Low-level to High-level to timing at which the intersection detection signal UV varies from High-level to Low-level. Further, the logic circuit unit 41A switches the switch SW to a switch contact "c" so as to select the sensor signal W2, during a period from timing at which the intersection detection signal WU varies from High-level to Low-level to timing at which the intersection detection signal VW varies from Low-level to High-level.

The intersection level adjusting unit 6A adjusts the selected selection signal X, based on the zero-cross toggle signal $S_T$ and amplitude levels at points of intersection of each pair of the sensor signals U2, V2 and W2, so that the amplitude level of the points of intersection in the selection signal X becomes a certain amplitude level with respect to the zero-crossing point as a reference level. Then, intersection level adjusting unit 6A outputs the adjusted selection signal X, as an intersection level adjustment signal Y, to the phase detecting unit 7. Here, the intersection level adjusting unit 6A adjusts the intersection level adjustment signal Y setting the zero-crossing point, where sensor signals U2, V2 and W2 pass the reference level, as the reference level.

Figure 6:
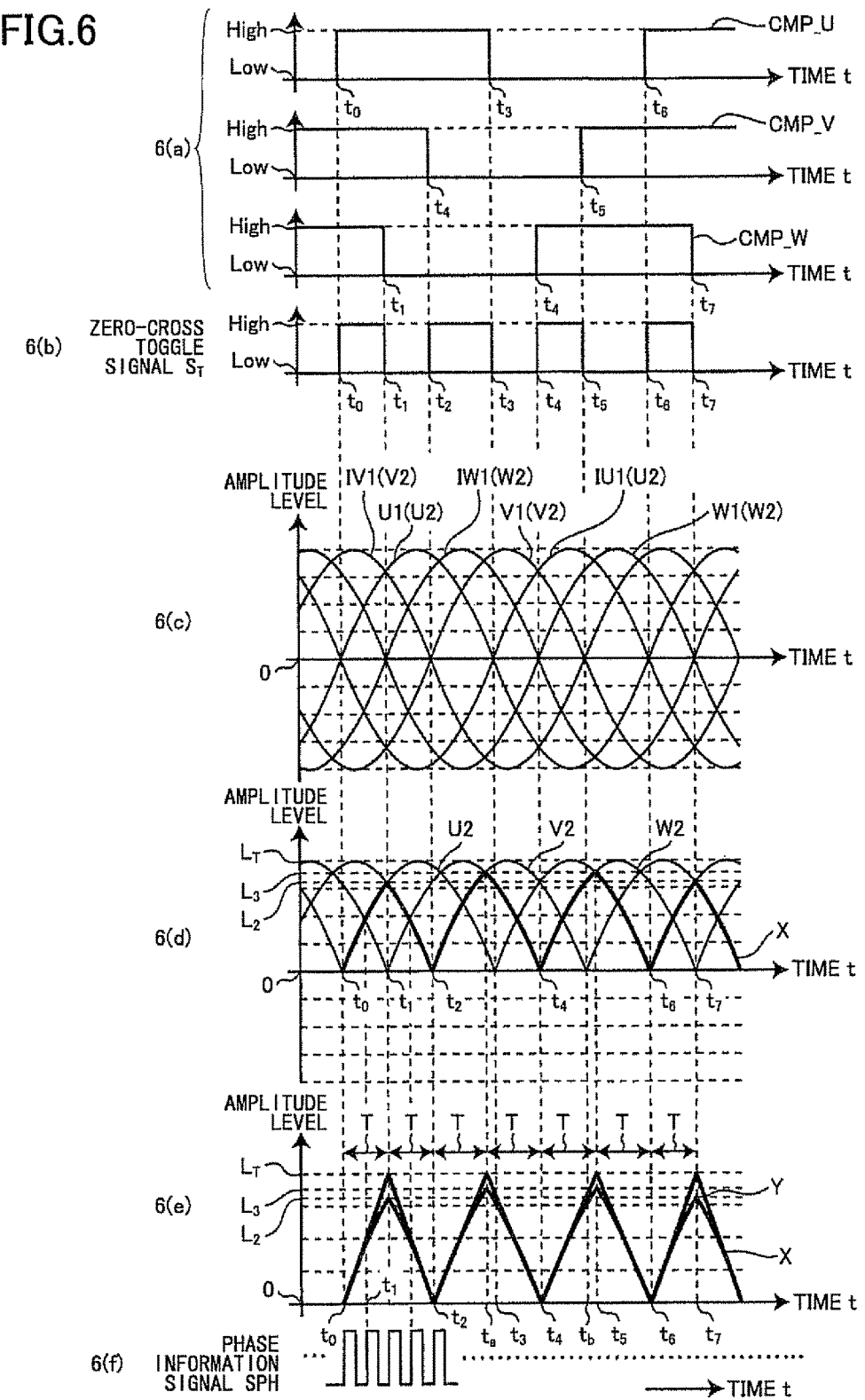
FIG. 6 is a timing diagram for illustrating an operation of the angle detecting device of the second embodiment.

In the following, an operation of the angle detecting device 1A of the second embodiment, configured as described above, will be described. FIG. 6 is a timing diagram for illustrating an operation of the angle detecting device 1A of the second embodiment.

Waveforms 6(*a*) in FIG. 6 illustrates variances of amplitude level of the reverse timing signals CMP_U, CMP_V and CMP_W, which are generated by the reverse timing detecting unit 8 of the angle detecting device 1A shown in FIG. 5, with respect to time t. In 6(*a*), High-level reverse timing signals CMP_U, CMP_V and CMP_W are respectively output in a case where amplitude levels of sensor signals U1, V1 and W1 from sensors S1, S2 and S3, which are respectively disposed at intervals of an electric angle 120°, are higher than the reference level. Also, Low-level reverse timing signals CMP_U, CMP_V and CMP_W are respectively output in a case where amplitude levels of the sensor signals U1, V1 and W1 from sensors S1, S2 and S3 are lower than the reference level.

Waveform 6(*b*) in FIG. 6 illustrates signal level variance of the zero-cross toggle signal $S_T$ generated by the zero-cross detecting unit 3 shown in FIG. 5, using an elapsed time base in common with that of 6(*a*). In 6(*b*), a timing diagram of the zero-cross toggle signal $S_T$ is shown where timings at which sine waves of the sensor signals U1, V1, and W1 pass the reference level is shown. Here, the zero-cross toggle signal $S_T$ becomes High-level at timing $t_0$ when the sensor signal U1 passes the reference level, and becomes Low-level at timing $t_1$ when the sensor signal W1 passes the reference level. Further, the zero-cross toggle signal $S_T$ becomes High-level at timing $t_2$ when the sensor signal V1 passes the reference level, and becomes Low-level at timing $t_3$ when the sensor signal U1 passes the reference level. Hereinafter similarly, the zero-cross toggle signal $S_T$ varies repeatedly.

Waveform 6(*c*) in FIG. 6 is a time base waveform diagram showing variances of amplitude levels of the sensor signals U2, V2 and W2 which are full-wave rectified by the full-wave rectification processing unit 9 shown in FIG. 5, using an elapsed time base in common with that of 6(*a*). In 6(*c*), the inverted sensor signal IV1, which is an inverted signal of the sensor signal V1, is output as the sensor signal V2 at timing $t_0$ and timing $t_2$. Also, the inverted sensor signal IW1, which is an inverted signal of the sensor signal W1, is output as the sensor signal W2 at timing $t_1$ and timing $t_4$. Further, the inverted sensor signal IU1, which is an inverted signal of the sensor signal U1, is output as the sensor signal U2 at timing $t_3$ and timing $t_6$.

Waveform 6(*d*) in FIG. 6 is a time base waveform diagram showing variances of amplitude level of the selection signal X which is selected by the signal selecting unit 4A shown in FIG. 5, using an elapsed time base in common with that of 6(*a*). In 6(*d*), a waveform of the selection signal X selected by the signal selecting unit 4 is shown in bold. That is, in a period from timing $t_0$ to timing $t_1$, the sensor signal U2 is selected, in a period from timing $t_1$ to timing $t_2$, the sensor signal V2 is selected, in a period from timing $t_2$ to timing $t_a$, the sensor signal V2 is selected, and in a period from timing $t_a$ to timing $t_4$, the sensor signal W2 is selected. Here, at timing $t_1$ and timing $t_7$, the selection signal X has an amplitude level $L_2$, and at timing $t_a$ and timing $t_b$, the selection signal X has an amplitude level $L_3$.

Waveform 6(*e*) in FIG. 6 illustrates variances of amplitude level of the intersection level adjustment signal Y which is adjusted by the intersection level adjusting unit 6A shown in FIG. 5, using an elapsed time base in common with that of 6(*a*). In 6(*e*), the intersection level adjustment signal Y, generated by adjusting amplitude levels at the peaks of the selection signal X to become a certain amplitude level, is shown. That is, zero-crossing points at timing $t_0$, timing $t_2$, timing $t_4$ and timing $t_6$ are set as reference levels, and intersection levels $L_2$ and $L_3$, at timing $t_1$, timing $t_7$, timing $t_a$ and timing $t_b$, are adjusted to a certain amplitude level $L_T$.

Waveform 6(*f*) in FIG. 6 illustrates the phase information signal SPH generated by the phase detecting unit 7 shown in FIG. 5, using an elapsed time base in common with that of 6(*a*). In 6(*f*), in each of phase sections T that is a period between the reference level and amplitude level $L_T$, a plurality of the threshold levels, which correspond to rotational positions of the rotor of the motor M1, are set. The phase information signal SPH is output at timing when the intersection level adjustment signal Y passes the threshold levels.

According to the angle detecting device 1A of the embodiment described above, a similar advantageous effect to that of the first embodiment can be achieved. Further, according to the angle detecting device 1A of the embodiment described above, compared with the angle detecting device 1 of the first embodiment, threshold levels need to be set, corresponding to the electric angles, only in the phase section T that is a period between the reference level and a certain amplitude level. Therefore, the number of comparators to be included in the phase detecting unit 7 can be reduced to half, thus the circuit scale can be reduced. According to the angle detecting device 1A of the embodiment described above, compared with the angle detecting device 1 of the first embodiment, only intersection levels in the full-wave rectified signal are adjusted. Therefore, an amplitude level of the signal can be reduced to half to allow setting a larger value as a certain amplitude level, then, errors in the phase information signal SPH can be further reduced. Therefore, a rotational position of the motor M1 can be detected more precisely.

Third Embodiment

In the angle detecting device of the second embodiment described above, a phase section T, corresponding to a range of electric angle 60°, is set. Meanwhile, the present embodiment is characterized by setting a phase section T corresponding to a range of electric angle 30°. Therefore, compared with the second embodiment, conditions, in which points of intersections are selected to have their amplitude levels adjust by the logic circuit unit 41 shown in FIG. 1, are different.

The logic circuit unit 41A controls the switch SW so as to select a sensor signal to have its amplitude level adjusted, based on signal level variances of intersection detection signals UV, VW and WU. Here, the logic circuit unit 41A controls the switch SW so as to switch to a switch contact "a" to select the sensor signal U2 as the selection signal X, when the intersection detection signal UV is Low-level and the intersection detection signal WU is High-level. Further, the logic circuit unit 41A controls the switch SW so as to switch to a switch contact "b" to select the sensor signal V2 as the selection signal X, when the intersection detection signal UV is High-level and the intersection detection signal VW is Low-level. Also, the logic circuit unit 41A controls the switch SW so as to switch to a switch contact "c" to select the sensor signal W2 as the selection signal X, when the intersection detection signal VW is High-level and the intersection detection signal WU is Low-level.

Figure 7:
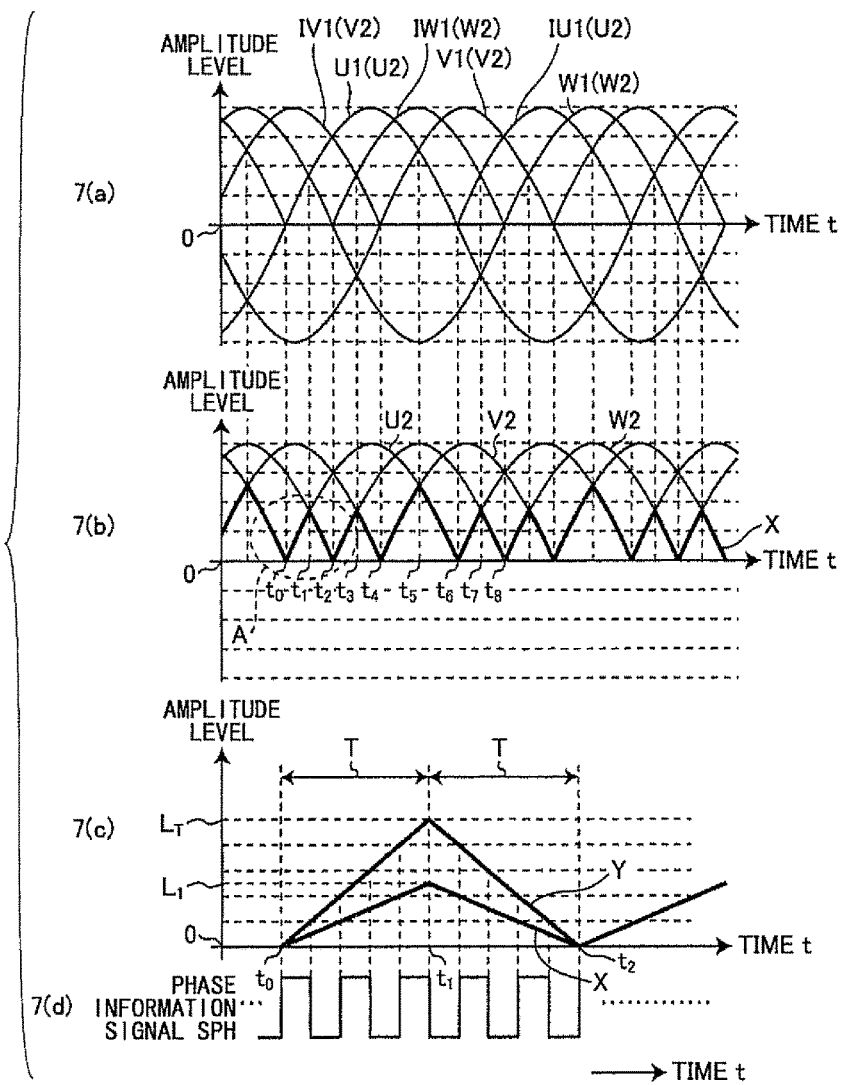
FIG. 7 is a timing diagram for illustrating an operation of the angle detecting device of the third embodiment.

FIG. 7 is a timing diagram for illustrating an operation of the angle detecting device 1A of the third embodiment.

Waveforms 7(a) in FIG. 7 illustrates variances of amplitude level of the sensor signals U2, V2 and W2, which are full-wave rectified by the full-wave rectification processing unit 9 shown in FIG. 5, with respect to time t. In 7(a), an inverted sensor signal IV1, which is generated by inverting the sensor signal V1, is output as the sensor signal V2. Also, an inverted sensor signal IW1, which is generated by inverting the sensor signal W1, is output as the sensor signal W2. Further, an inverted sensor signal IU1, which is generated by inverting the sensor signal U1, is output as the sensor signal U2.

Waveforms 7(b) in FIG. 7 illustrates variances of the selection signal X which is selected by the signal selecting unit 4A shown in FIG. 5, using an elapsed time base in common with that of 7(a). In 7(b), a waveform of the selection signal X selected by the signal selecting unit 4A is shown in bold. That is, in a period from timing $t_0$ to timing $t_1$, the sensor signal U2 is selected, in a period from timing $t_1$ to timing $t_2$, the sensor signal W2 is selected, and in a period from timing $t_3$ to timing $t_4$, the sensor signal V2 is selected.

Waveforms 7(c) in FIG. 7 illustrates variances of amplitude level of the intersection level adjustment signal Y which is generated by adjusting the amplitude level of the selection signal X in an area A of 7(b) using the intersection level adjusting unit EA shown in FIG. 5. In 7(c), the intersection level adjustment signal Y is shown, in which an amplitude level $L_1$ at the peak of the signal, in the area A of 7(b), is adjusted to become an amplitude level $L_T$. That is, zero-crossing points at timing $t_0$ and timing $t_2$ are set as reference levels, and intersection level $L_1$, at timing $t_1$, is adjusted to an amplitude level $L_T$.

Waveform 7(d) illustrates the phase information signal SPH generated by the phase detecting unit 7 shown in FIG. 5, using an elapsed time base in common with that of 7(a). In 7(d), in each of phase sections T that is a period between the reference level and amplitude level $L_T$, a plurality of the threshold levels, which correspond to rotational positions of the rotor of the motor M1, are set. The phase information signal SPH is output at timings when the intersection level adjustment signal Y passes the threshold levels.

In the present embodiment, in a phase section T corresponding to a range of electric angle 30°, the phase information signal SPH is output five times. In this case, the amplitude level $L_T$ corresponds to an amplitude rate of 0.500 at electric angle 30°, and a plurality of threshold levels are set for the amplitude rates at electric angles. That is, in the phase section T that is a period between the reference level and the amplitude level $L_T$, five threshold levels are set, while the phase information signal SPH is output at timings when the intersection level adjustment signal Y passes the threshold levels.

According to the angle detecting device 1A of the embodiment described above, a similar advantageous effect to that of the angle detecting device 1 of the first embodiment can be achieved. Further, according to the angle detecting device 1A of the embodiment described above, compared with the angle detecting device a 1A of the second embodiment, errors in the phase information signal can be further reduced, then a more precise phase information signal can be generated. Therefore, rotational position information of the motor M1 can be detected more precisely, compared with the angle detecting device 1A of the second embodiment.

Fourth Embodiment

In the angle detecting device 1A of the second embodiment described above, points of intersections between each pair of the paired sensor signals may shift due to individual differences of the sensors themselves. Meanwhile, the present embodiment is characterized by correcting positional shifts of the points of intersections between each pair of the paired sensor signals.

Figure 8:
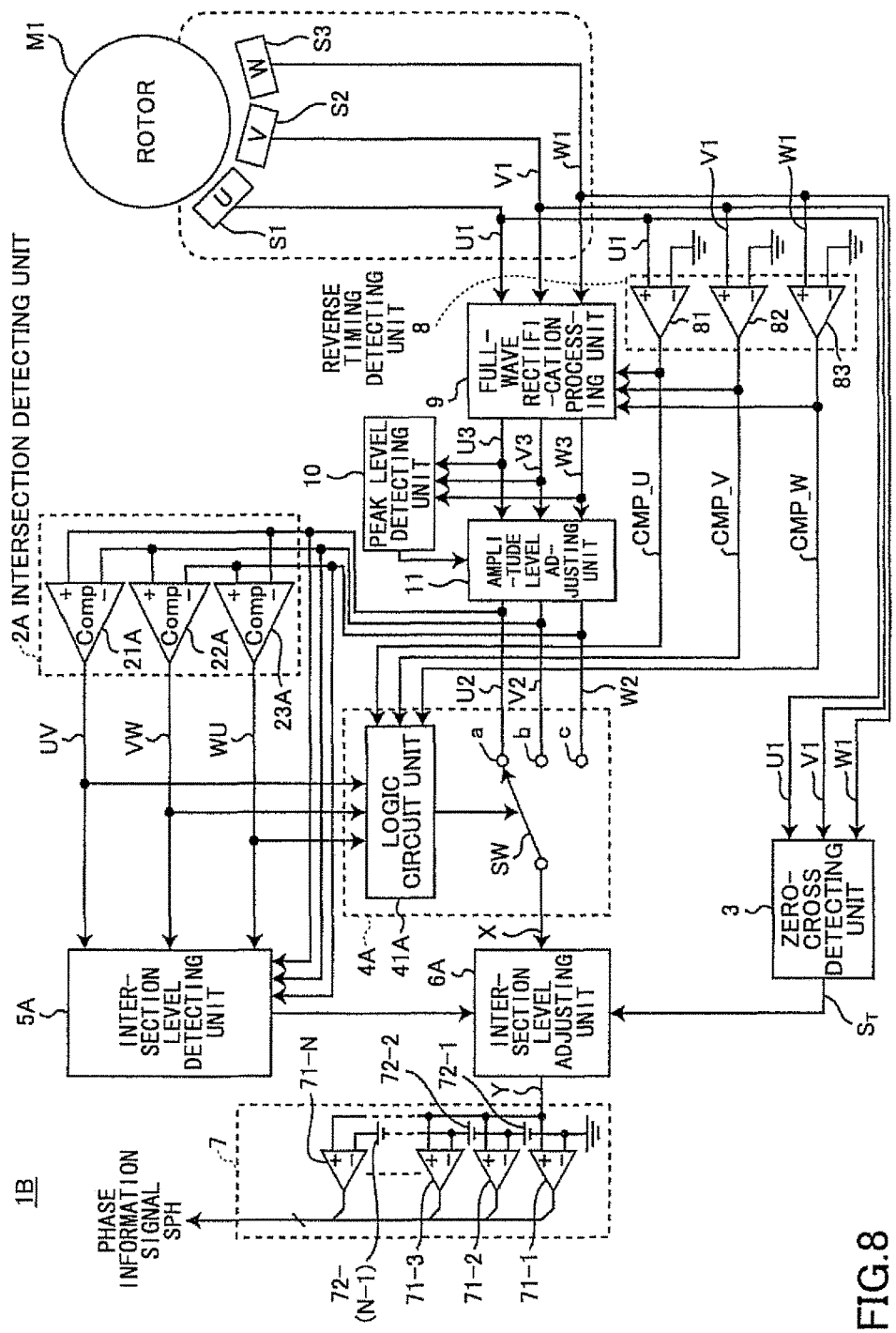
FIG. 8 is a block diagram showing a configuration of an angle detecting device of the fourth embodiment.

FIG. 8 is a block diagram showing a configuration of an angle detecting device 1B of the fourth embodiment. The angle detecting device 1B shown in FIG. 8, compared with the angle detecting device 1A shown in FIG. 5, is characterized by including a peak level detecting unit 10 and an amplitude level adjusting unit 11.

The peak level detecting unit 10 respectively detects peak levels of sensor signals U3, V3 and W3 full-wave rectified by the full-wave rectification processing unit 9, and outputs values of the detected peak levels to the amplitude level adjusting unit 11. The amplitude level adjusting unit 11 adjusts the sensor signals U3, V3 and W3 so that peak levels of the signals respectively become a certain amplitude level to generate sensor signals U2, V2 and W2. Then, the amplitude level adjusting unit 11 respectively outputs the sensor signals U2, V2 and W2 as sensor processing signals to the intersection detecting unit 2A, the intersection level detecting unit 5A and the signal selecting unit 4A.

In the following, an operation angle detecting device 1B of the fourth embodiment, configured as described above, will be described.

The operation of the angle detecting device 1B of the fourth embodiment is different from that of the angle detecting device 1A of the second embodiment, since an operation of the peak level detecting unit 10 and an operation of the amplitude level adjusting unit 11 are added.

Therefore, in the following, the operation of the peak level detecting unit 10 and the operation of the amplitude level adjusting unit 11 will be described.

Figure 9:
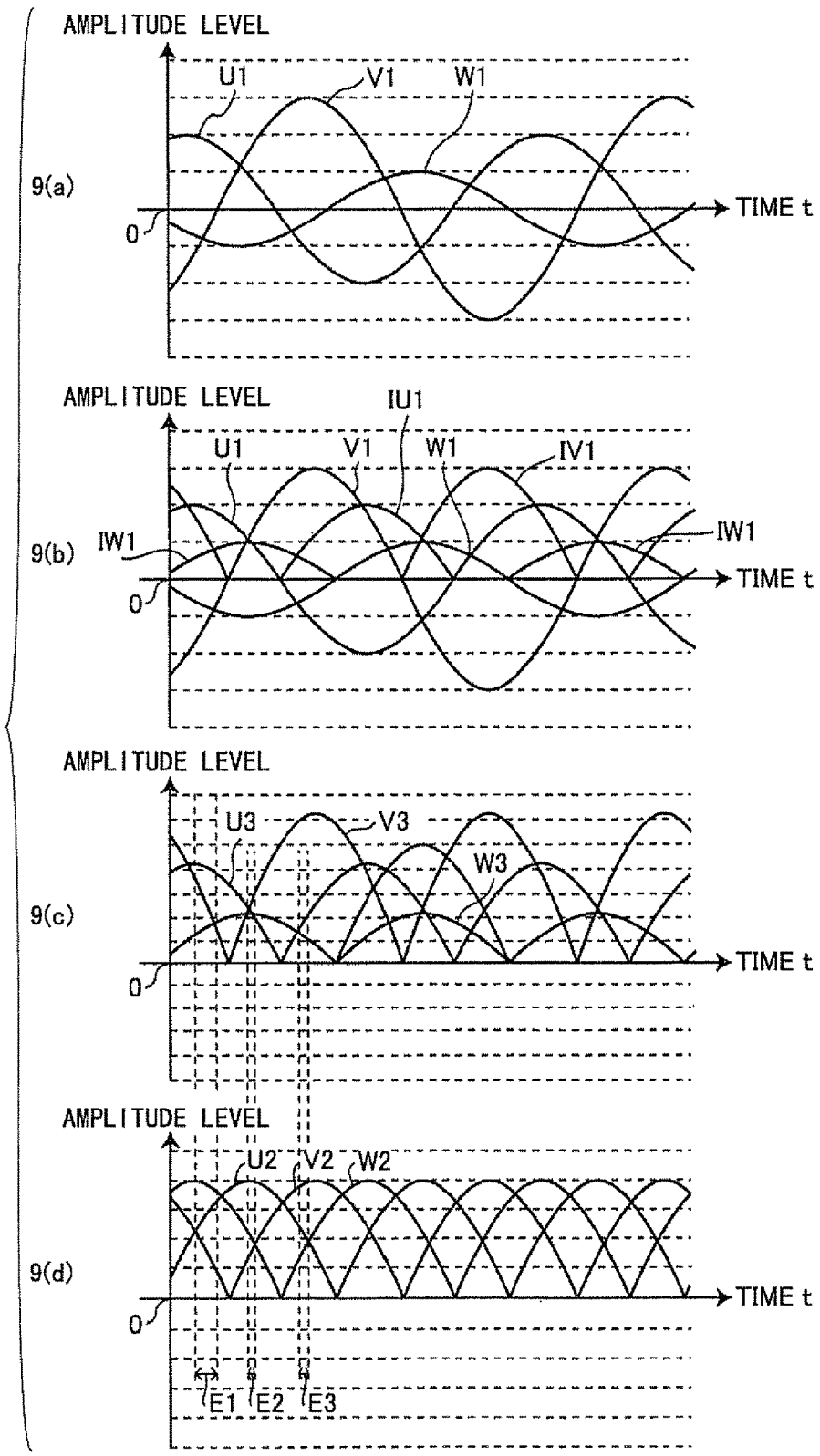
FIG. 9 is a timing diagram for illustrating an operation angle detecting device of the fourth embodiment.

FIG. 9 is a timing diagram for illustrating an operation angle detecting device 1B of the fourth embodiment.

Waveform 9(a) in FIG. 9 is a time base waveform diagram showing variances of amplitude level of the sensor signals U1, V1 and W1, which are generated by the sensors S1, S2 and S3 of the angle detecting device 1B shown in FIG. 8, with respect to time t. Waveform 9(b) is a time base waveform diagram showing variances of amplitude levels of the inverted sensor signals IU1, IV1 and IW1 being inverted and generated by the full-wave rectification processing unit 9 shown in FIG. 8, using an elapsed time base in common with that of 9(a). Waveform 9(c) in FIG. 9 is a time base waveform diagram showing variances of amplitude levels of the sensor signals U3, V3 and W3 full-wave rectified by the full-wave rectification processing unit 9, using an elapsed time base in common with that of 9(a). Waveform 9(d) in FIG. 9 is a time base waveform diagram showing variances of amplitude levels of the sensor signals U2, V2 and W2 with their amplitude levels adjusted by the amplitude level adjusting unit 11, using an elapsed time base in common with that of 9(a).

As shown in 9(a), amplitude levels of the sensor signals U1, V1 and W1 vary according to magnetic flux density variation of the rotor of the motor M1 and further vary due to individual differences of the sensors themselves. Then, in 9(b), waveforms of the sensor signals U1, V1 and W1 respectively fold back at the reference level when their amplitude levels are equal to or less than the reference level. Next, as shown in 9(c), the sensor signals U3, V3 and W3, which are full-wave rectified by the full-wave rectification processing unit 9, are output to the amplitude level adjustment unit 11. Then, in 9(d), the sensor signals U2, V2 and W2, which are generated by adjusting peak levels of the sensor signals U3, V3 and W3, are shown.

In 9(a)-9(d), in a case where amplitude levels are different from each other due to individual differences of the sensors themselves, amplitude levels of the sensor signals U3, V3 and W3, which are generated by the full-wave rectifying sensor signals S1, S2 and S3, are also different from each other. Therefore, positions of points of intersections between signals, having different amplitude levels, shift to one side or the other. Thus, as shown in 9(c) and 9(d), errors in positions of points of intersection E1, E2, E3 are made. Since the errors E1, E2, E3 remain to be errors in pulse width of the phase information signal, it is not possible to detect rotational position information of the motor M1 with high precision. Therefore, the peak levels of the sensor signals U3, V3 and W3, which are full-wave rectified, are detected, and adjusted to a certain amplitude level to correct shifts in intersection levels to zero, in order to precisely detect rotational position information of the motor M1.

According to the angle detecting device 1B of the embodiment described above, a similar advantageous effect to that of the angle detecting device 1 of the first embodiment can be achieved. Also, according to the angle detecting device 1B of the embodiment described above, compared with the angle detecting device 1A of the second embodiment, rotational position information of the motor M1 can be detected more precisely, since shifts in positions of points of intersections between signals can be corrected.

Additionally, although in the embodiments described above, the rotational position information of the motor M1 is detected using the sensor signals U1, V1 and W1 which are generated by the sensors S1, S2 and S3, this is not a limiting example. For example, the rotational position information of the motor M1 may be detected using in-phase level sensor signals generated by correcting errors in phases of the sensor signals U1, V1 and W1.

Also, the angle detecting devices 1, 1A and 1B in the embodiments described above may be manufactured as semiconductor integrated circuits, or as semiconductor devices. Further, the angle detecting devices 1, 1A and 1B may be manufactured integrated with drive control devices of the motor M1.

In the fourth embodiment described above, although shifts of points of interconnections between signals, which are full-wave rectified by the full-wave rectification processing unit 9, are corrected, shifts of points of interconnections between the paired sensor signals U1, V1 and W1, for example, may be corrected. In this case, also, a similar advantageous effect to that of the angle detecting device of the fourth embodiment can be achieved.

Further, although, in the embodiments described above, a section corresponding to a range of electric angle 30° or range of electric angle 60° is set as a phase section T, this is not a limiting example. For example, a section corresponding to a range of electric angle from 30° to 60° may be set as a phase section T. In this case, also, a similar advantageous effect to that of the embodiments described above can be achieved.

Also, the angle detecting device of the embodiments described above can be applied to a motor device having a rotor of a motor M1. In this case, the motor device, having the angle detecting device described above, controls the rotor of the motor M1 in the motor device based on rotational position information from the angle detecting device. Additionally, the motor device is configured to include a motor M1 and a motor drive controlling device.

Summary of Embodiments

The angle detecting device in a first mode is characterized by being an angle detecting device, generating phase information for indicating phases corresponding to rotational positions of a rotor of a motor having plural phases of coils based on a plurality of sensor signals, each of which has a signal level indicative of a rotational position of the rotor of the motor, to detect the rotational positions of the rotor of the motor, comprising:

an intersection detecting unit, receiving the sensor signals, configured to detect timing at which the sensor signals are paired and intersect with each other, and to detect points of intersection between the paired sensor signals;

an intersection level detecting unit configured to detect intersection levels that are amplitude levels of the sensor signals at the points of intersection, based on the timings at which the respective paired sensor signals intersect with each other;

an intersection level adjusting unit configured to adjust the detected intersection levels of the sensor signals to a certain amplitude level, to output a successively selected one of the adjusted sensor signals as an intersection level adjustment signal; and a phase information detecting unit configured to generate detection results indicative of whether the intersection level adjustment signal is greater than respective threshold levels corresponding to the phases, thereby generating the phase information responsive to the detection results, wherein a plurality of the threshold levels are set in every phase section, which is a period between a phase where an intersection level adjustment signal becomes the certain amplitude level and a phase where the intersection level adjustment signal becomes a reference level.

The angle detecting device in a second mode is characterized by being the angle detecting device as described in the first mode, further comprising a full-wave rectification processing unit configured to full-wave rectify the sensor signals, wherein the sensor signals received by the intersection detecting unit are the full-wave rectified sensor signals.

The angle detecting device in a third mode is characterized by being the angle detecting device as described in the first mode, further comprising:

a full-wave rectification processing unit configured to full-wave rectify the sensor signals and respectively output the sensor signals as full-wave rectified signals;

a peak level detecting unit configured to respectively detect peak levels that are highest amplitude levels of the full-wave rectified signals; and an amplitude level adjusting unit configured to adjust values of the detected peak levels to a value of a certain amplitude level and to output the adjusted full-wave rectified signals, wherein the sensor signals received by the intersection detecting unit are the adjusted full-wave rectified sensor signals.

The angle detecting device in a fourth mode is characterized by being the angle detecting device as described in any one of the first mode to the third mode, further comprising:

a plurality of magnetic sensors configured to respectively generate and output the sensor signals having signal levels corresponding to the rotational positions of the rotor of the motor;

wherein the magnetic sensors are disposed at intervals of an electric angle of 120°.

The angle detecting device in a fifth mode is characterized by being the angle detecting device as described in any one of the first mode to the fourth mode, further comprising:

a zero-cross detecting unit configured to detect zero-crossing points where each of the sensor signals becomes the reference level, wherein the intersection level adjusting unit adjusts the intersection level adjustment signal setting an amplitude level of the zero-crossing points as the reference level.

The angle detecting device in a sixth mode is characterized by being the angle detecting device as described in any one of the first mode to the fifth mode, wherein the threshold levels corresponding to the phases are proportional to the phases, respectively.

The angle detecting device in a seventh mode is characterized by being the angle detecting device as described in any one of the fifth mode to the sixth mode, wherein the phase section corresponds to a range of electric angle from 30° to 60°.

The motor drive controlling device in an eighth mode is characterized by the angle detecting device as described in any one of the first mode to the seventh mode.

The motor device in a ninth mode is characterized by the motor drive controlling device as described in the eighth mode, and a motor controlled by the motor drive controlling device.

Further, the present invention is not limited to these embodiments, and numerous variations and modifications may be made without departing from the scope of the present invention.

The present application is based on and claims the benefit of priority to Japanese Patent Application No. 2014-044228 filed on Mar. 6, 2014, the entire contents of which are hereby incorporated by reference.

DESCRIPTION OF THE REFERENCE NUMERALS 1, 1A, 1B angle detecting device
2, 2A intersection detecting unit
3 zero-cross detecting unit
4, 4A signal selecting unit
5, 5A intersection level detecting unit
6, 6A intersection level adjusting unit
7 phase detecting unit
8 reverse timing detecting unit
9 full-wave rectification processing unit
10 peak level detecting unit
11 amplitude level adjusting unit
41, 41A logic circuit unit
71-1~71-N phase detector
72-1~72-N voltage source
21, 22, 23, 21A, 22A, 23A, 81, 82, 83 comparator

The invention claimed is:

1. An angle detecting device that is used for controlling a motor by using at least a plurality of sensor signals, each of which has a signal level indicative of a rotational position of a rotor of the motor, comprising:

a signal selection unit configured to select a sensor signal from the plurality of sensor signals in every phase section, thereby outputting the selected sensor signal, the phase section being defined by at least one of a magnitude relationship between amplitude levels of the plurality of sensor signals and a magnitude relationship between processed sensor signals respectively obtained by processing the plurality of sensor signals;

a level adjusting unit configured to change an amplitude level of the selected sensor signal into a predetermined amplitude level, thereby outputting a level adjustment signal; and a phase information detecting unit configured to output the phase information indicating a rotation angle that is less than a rotational angle of the motor in the phase section by determining whether an amplitude level of the level adjustment signal is greater than respective threshold levels corresponding to the phase section.

2. The angle detecting device as claimed in claim 1, further comprising a full-wave rectification processing unit configured to full-wave rectify the sensor signals, wherein the sensor signals received by the signal selection unit are the full-wave rectified sensor signals.

3. The angle detecting device as claimed in claim 1, further comprising an intersection level detecting unit configured to detect intersection levels that are amplitude levels of signals at points of intersection at which any one of the sensor signals of a pair of sensor signals and the processed sensor signals of a pair of processed sensor signals intersect with each other, wherein the level adjusting unit changes the amplitude level of the selected sensor signal to output the level adjustment signal by comparing any one of respective intersection levels of the sensor signals and respective intersection levels of the processed sensor signals with a predetermined amplitude level.

4. The angle detecting device as claimed in claim 1, wherein the level adjusting unit changes a positive amplitude level of the selected sensor signal by comparing respective intersection levels of the sensor signals, which are positive amplitude levels, with a predetermined positive amplitude level, and changes a negative amplitude level of the selected sensor signal by comparing respective intersection levels of the sensor signals, which are negative amplitude levels, with a predetermined negative amplitude level, thereby outputting the level adjustment signal.

5. The angle detecting device as claimed in claim 1, further comprising:

a plurality of magnetic sensors configured to respectively generate and output the sensor signals having signal levels corresponding to the rotational positions of the rotor of the motor; wherein the magnetic sensors are disposed at intervals of an electric angle of 120°.

6. The angle detecting device as claimed in claim 1, wherein the phase section corresponds to a range of electric angle from 30° to 60°.

7. A motor drive controlling device, comprising the angle detecting device as claimed in claim 1.

8. A motor device, comprising the motor drive controlling device as claimed in claim 7; and a motor controlled by the motor drive controlling device.

9. A method of controlling an angle detecting device that is used for controlling a motor by using at least a plurality of sensor signals, each of which has a signal level indicative of a rotational position of a rotor of the motor, the method comprising the step of:

selecting a sensor signal from the plurality of sensor signals in every phase section, thereby outputting the selected sensor signal, the phase section being defined by at least one of a magnitude relationship between amplitude levels of the plurality of sensor signals and a magnitude relationship between processed sensor signals respectively obtained by processing the plurality of sensor signals;

changing an amplitude level of the selected sensor signal into a predetermined amplitude level, hereby outputting an level adjustment signal; and outputting the phase information indicating a rotation angle that is less than a rotational angle of the motor in the phase section by determining whether an amplitude level of the level adjustment signal is greater than respective threshold levels corresponding to the phase section.

* * * * *